Aug. 3, 1948.    L. LETTERMAN    2,446,481
REDUCING FLANGE

Filed Feb. 5, 1945    2 Sheets-Sheet 1

INVENTOR.
Louis Letterman

Aug. 3, 1948.    L. LETTERMAN    2,446,481
REDUCING FLANGE
Filed Feb. 5, 1945    2 Sheets-Sheet 2
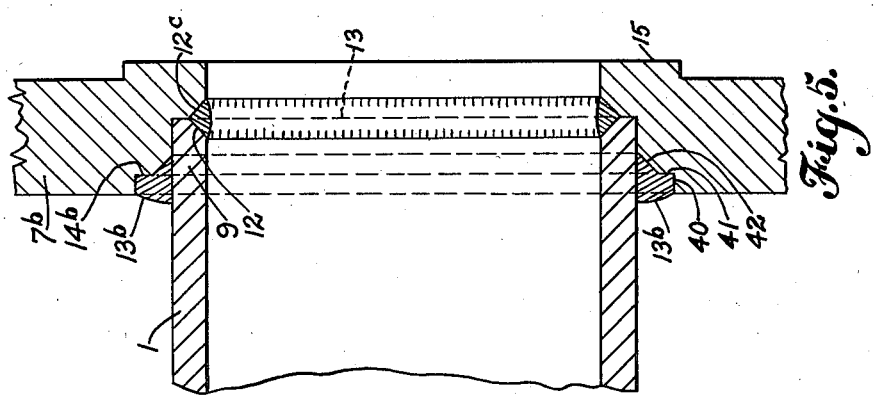
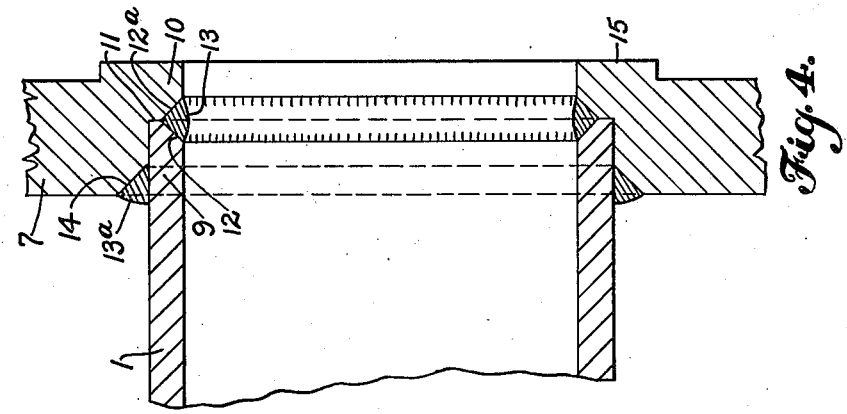
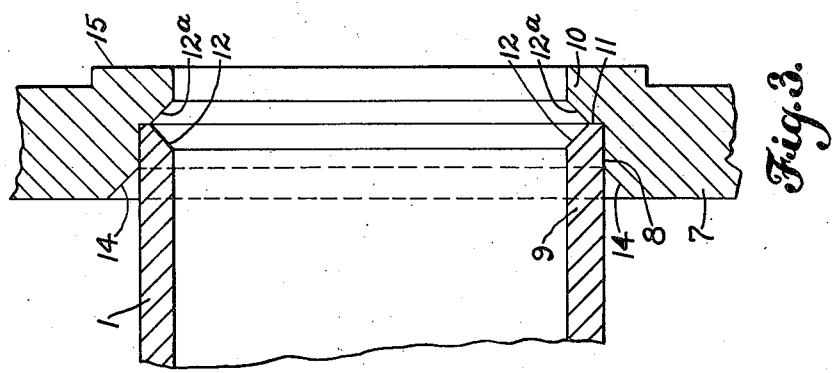
INVENTOR.
Louis Letterman
BY
Heard Smith Tennant
Attorneys.

Patented Aug. 3, 1948

2,446,481

UNITED STATES PATENT OFFICE 2,446,481

REDUCING FLANGE

Louis Letterman, Winthrop, Mass.

Application February 5, 1945, Serial No. 576,220

1 Claim. (Cl. 285—183)

This invention relates to pipe flanges such as are used for connecting one pipe to another pipe or to an elbow or a T and which are welded to the parts to be connected.

In pipe flanges of this type, the common practice is to employ flanges having a central opening of uniform diameter and of a size to receive the end portion of the pipe to which it is to be welded, said flange being welded to the exterior of the pipe and the end of the pipe being also welded to the flange at the interior of the bore.

Such flanges are standardized as to size and diameter of bolt hole circle for the various sizes of pipe, there being a standard size of flange with its standard diameter of bolt hole circle for each separate size of pipe. The size and dimension of the standard flange for any size of pipe differs from those for any other size of pipe so that a flange which is standard for one size of pipe cannot be bolted to a flange which is standard for some other size of pipe.

When it is necessary to connect together two pipes of different diameter which have flanges welded thereto, it is a common practice to employ a reducing pipe section, which is a short section of pipe that is larger at one end than at the other, the larger end being of the same size as the larger of the two pipes to be connected and the small end being of the same size as the smaller of the two pipes to be connected. Sometimes such a reducing pipe section has welded to its larger end a flange which is standard for a pipe of the larger size and which can, therefore, be bolted to the mating or companion standard flange that is welded to the end of the larger pipe, and said reducing pipe section also has welded to its smaller end a smaller flange which, however, is standard for a pipe of the size of the smaller end and which, therefore, is of the same size and can be bolted to a standard companion flange that is welded to the end of the smaller pipe.

Such a construction involves the use of four flanges and a reducing pipe section in order to connect the smaller pipe to the larger pipe.

It is also more or less common to weld one end of the reducing pipe section to one of the pipes to be connected together and then to flange the other end of the reducing pipe section to the other pipe by means of companion flanges that are welded to said reducing pipe section and other pipe respectively.

One object of my invention is to provide a novel construction by which two pipes of different sizes, each having a flange welded thereto, may be directly connected together without the use of a reducing pipe section.

This is accomplished by using on the mating ends of the two pipes of different diameter flanges which are of the same size and which are standard in size and diameter of bolt hole circle for the smaller pipe, and making the opening through the flange used on the larger pipe with a counterbore of a size to receive said larger pipe, which counterbore extends nearly but not quite through said flange, thereby providing a shoulder against which the end of the larger pipe may seat, and by further making the larger pipe with a beveled end face which inclines inwardly and backwardly and also providing said shoulder with a beveled face which with the beveled end face of the pipe forms a welding groove to receive the welding material by which the flange is welded to the pipe end. The flange is also preferably welded to the exterior of the pipe of larger size at the point where said pipe enters the counterbore. With this construction the two pipes of different diameter can be connected by the use of two flanges only, both of which are standard as to size and diameter of bolt hole circle for the pipe of smaller size. An advantage of this construction is that it reduces very materially the weight of the means employed for connecting the two pipes of different sizes, partly because the weight of the reducing pipe section and its flanges is entirely eliminated and partly because the flange which is employed on the larger pipe is of less weight than a flange which is standard for said size of pipe.

Another advantage of the invention is that the full gasket area is retained on flanges even though the flange which is used for the larger pipe section is smaller than a flange which is standard for said size of pipe.

Another feature relates to the novel manner in which the flange with the counterbore is welded to the corresponding pipe.

My improved flange is applicable not only for flanging pipe sections together but also for flanging pipes to T's or elbows where it is desired to connect to the T or elbow a pipe having a smaller diameter than the through opening in said T or elbow, in which case the improved flange acts as a reducer.

In order to give an understanding of the invention, I have illustrated in the drawings some selected embodiments thereof which will now be described after which the novel features will be pointed out in the appended claim.

In the drawings:

Fig. 3 is an enlarged fragmentary view showing a flange embodying my invention with a pipe end inserted into the counterbore thereof ready for the welding operation.

Fig. 4 is a view illustrating the pipe welded to the flange in accordance with my invention.

Fig. 5 is a fragmentary view showing a different embodiment of the invention.

Figure 1:
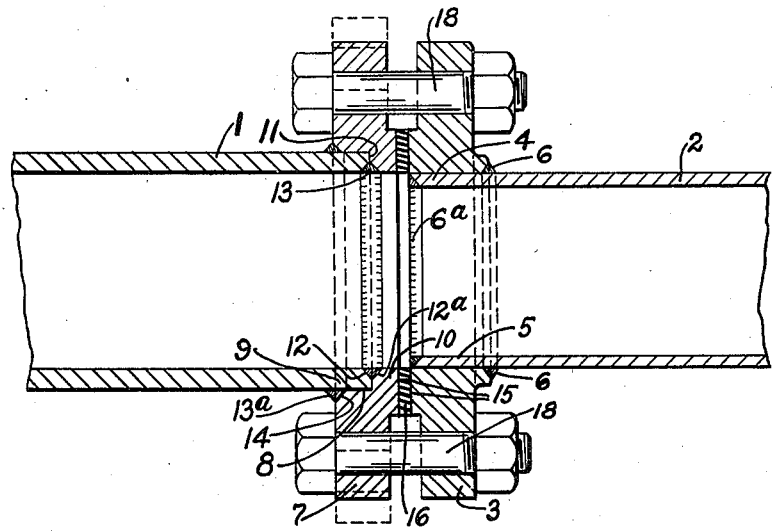
Fig. 1 is a sectional view showing my invention as it might be employed in flanging together two pipes of different diameter.
Figure 2:
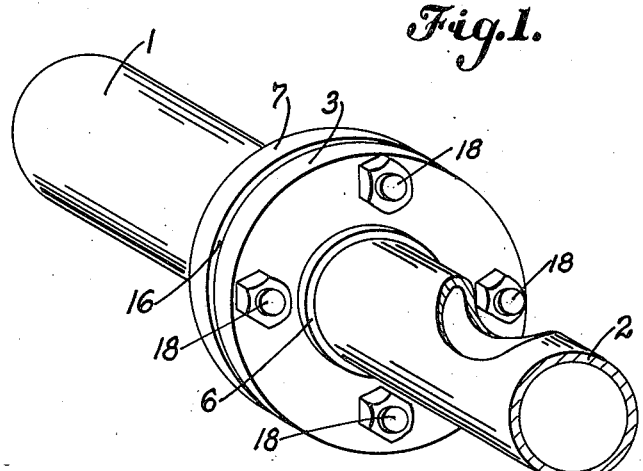
Fig. 2 is a perspective view of two pipes of different sizes flanged together with a flange embodying the invention.

In Fig. 1, 1 and 2 indicate two pipes which are to be connected together, the pipe 1 having a larger diameter than the pipe 2. 3 indicates a flange which is standard in size and dimension of bolt hole circle for the smaller pipe 2 and which has a through opening 4 of a size to receive the end portion 5 of the pipe 2. This flange is welded to the pipe at the point 6 where the pipe enters the flange and the extremity of the pipe is also welded to the flange as indicated at 6a, this being the usual way in which standard flanges are welded to pipes. The flange which is used on the pipe 1 of larger diameter and which embodies my invention is indicated at 7. This flange has the same size and diameter of the bolt hole circle as the mating flange 3, in other words, the flange 7 which is used on the larger pipe is standard as to size and diameter of bolt hole circle for the pipe 2 of smaller diameter. The flange 7, however, is counterbored as shown at 8 to provide a counterbore of a diameter to receive the end portion 9 of the pipe 1 of larger diameter. This counterbore 8 extends nearly but not quite through the flange 7, thereby leaving a flange portion 10 at the inner end of the counterbore and providing a shoulder 11 against which the end of the pipe 1 is seated. The extremity of the pipe 1 is beveled inwardly and backwardly as shown at 12, and the shoulder 11 is also formed with a complemental beveled face 12a, which forms with the bevel face 12 on the end of the pipe a wide angle annular groove for receiving the welding material 13 during the welding operation. The flange 7 also has the beveled surface 14 at its outer face, thereby providing with the pipe an annular groove on the exterior of the pipe 1. The flange 7 is welded to the pipe section 1 by making a weld 13 which fills the space between the beveled face 12 of the pipe and the beveled face 12a of the shoulder 11, and also by making another weld 13a on the outside of the pipe which fills the groove formed by the beveled face 14.

In welding the flange 7 to the pipe 1, the weld 13 is preferably made first, after which the weld 13a is made. In the making of the weld 13 the heat generated in fusing the end of the pipe to the shoulder 11 is sufficient to also fuse the exterior of the pipe end 9 to the wall of the counterbore 8, thereby expelling any gases generated by the welding operation which might accumulate in space between said pipe end 9 and the wall of the counterbore. When the weld 13a is made there will be no gases between the two welds that could be trapped in said space by the making of said weld 13a. This is an important feature because the presence of a gas pocket in said space between the two welds is a source of weakness and is therefore detrimental. Furthermore the wide angle groove which is formed by the beveled faces 12 and 12a permits a satisfactory weld 13 to be made without leaving the rough unfinished surface and shoulder which results when a standard straight flange is welded to the end of a pipe. The opening through the flange 7 may be substantially the same diameter as the inside of the pipe and as stated above, the wide angle annular groove formed between the two beveled faces 12 and 12a gives ample room for producing a weld which comes flush with the inside of the pipe, thereby making a smooth finished surface.

These welded flanges are frequently made with raised gasket areas immediately surrounding the opening therethrough as shown at 15, the two gasket areas of two companion flanges that are bolted together receiving between them a gasket 16. With the construction above described the counterbored flange 7 still retains its full gasket area which corresponds in size to that of the standard flange 3, and therefore when the two flanges are bolted together by the bolts 18 a full sized gasket may be employed.

My improvement thus makes it possible to connect together two pipes of different sizes without the necessity of using the reducing pipe section. This is of very great advantage in connection with ship building operations in which it is important to save as much weight as possible.

In Fig. 1, I have shown in dotted lines the size of a flange which would be standard for a pipe of the larger size such as shown at 1 and the dotted lines also show the standard diameter of bolt hole circle for such flange. With my invention wherein it is possible to use on the larger pipe a flange which is standard in size and bolt hole circle for the smaller pipe, there is a reduction in weight due to the fact that the flange 7 used on the larger pipe is of less weight than the standard flange for said pipe.

While I have illustrated the invention as it would be used in connecting two pipes of different diameter, yet it will be obvious that it is equally applicable for connecting an arm of a T with a pipe having a diameter smaller than said arm and it is also equally applicable for connecting an elbow to a pipe of smaller diameter.

An advantage of the invention as applied to connecting a T to a pipe of smaller diameter is that the connection is accomplished within the overall dimensions of a standard T and without the use of a length of reducing pipe section as has been the common practice.

My invention may also be embodied in flanges for connecting pipes of the same size by using for this purpose flanges which are smaller in size and diameter of bolt hole circle than a standard straight flange for the size of pipes to be connected and by counterboring the flanges so as to receive the ends of the pipes to be connected. In such a construction a material saving in weight results because of the use of the smaller flanges. Furthermore such smaller flanges are of great advantage in installing a piping where space is at a premium and it is necessary to place a line of pipe closer to a partition, bulkhead, etc., than would be permitted by the use of the standard straight flange for the size of piping being installed.

In Fig. 5 I have shown a flange embodying my invention which is provided with a shouldered groove 14b adapted to receive the welding 13b. This groove 14b is formed partially by counterboring the opening through the flange to form the right angular faces 40, 41 and is also provided with the inclined face 42. This form of groove provides a somewhat more substantial weld 13b than the groove 14 shown in Fig. 1.

I claim:

The combination with two pipes of different sizes to be connected together, of a steel flange provided with bolt holes, said flange being standard as to size and diameter of bolt hole circle for the smaller pipe and having a central opening of a size to fit said smaller pipe and in which the end of said pipe is received, said flange being welded to said pipe, and a companion flange having the same diameter as the first-named flange, which companion flange is also standard as to size and diameter of bolt hole circle for the smaller pipe and has a two diameter opening therethrough with an interior shoulder between the portions of the opening of different diameter, the portion of the opening of smaller diameter being of the same size as the opening in the first-named flange, thereby providing both flanges with the same gasket area, and the portion of the opening of larger diameter being of a size to receive and receiving the end of the larger pipe, the end face of said larger pipe being beveled inwardly and backwardly and said shoulder having a complemental beveled surface which, with the beveled surface of the pipe, forms a wide-angle annular welding groove, said pipe of larger diameter and said companion flange being welded together by a weld which fills said groove and further being welded together at the point where the pipe of larger diameter enters the companion flange, a gasket between the equal gasket areas of said flanges and bolts extending through holes in said flanges and bolting them together.

LOUIS LETTERMAN.

REFERENCES CITED

The following references are of record in the file of this patent:

UNITED STATES PATENTS

| Number | Name | Date |
|---|---|---|
| 697,827 | Fluder | Apr. 15, 1902 |
| 748,807 | Spratt | Jan. 5, 1904 |
| 831,588 | Wood | Sept. 25, 1906 |
| 1,474,995 | Burroughs | Nov. 20, 1923 |
| 2,181,196 | Miller | Nov. 28, 1939 |

FOREIGN PATENTS

| Number | Country | Date |
|---|---|---|
| 320,754 | Great Britain | Oct. 24, 1929 |